(12) United States Patent
Al-Khamis

(10) Patent No.: US 8,358,020 B2
(45) Date of Patent: Jan. 22, 2013

(54) METHOD AND APPARATUS FOR STORING ENERGY

(75) Inventor: Mohammed Abdulaziz Al-Khamis, Riyadh (SA)

(73) Assignee: King Saud University (SA)

( * ) Notice: Subject to any disclaimer, the term of this patent is extended or adjusted under 35 U.S.C. 154(b) by 351 days.

(21) Appl. No.: 12/744,447

(22) PCT Filed: Nov. 24, 2008

(86) PCT No.: PCT/EP2008/009948
§ 371 (c)(1), (2), (4) Date: Jul. 8, 2010

(87) PCT Pub. No.: WO2009/065619
PCT Pub. Date: May 28, 2009

(65) Prior Publication Data
US 2010/0301616 A1    Dec. 2, 2010

(30) Foreign Application Priority Data
Nov. 24, 2007    (GC) .................................. 9531/2007

(51) Int. Cl.
*F02B 63/04*    (2006.01)
*F03G 7/08*    (2006.01)
*H02K 7/18*    (2006.01)
(52) U.S. Cl. .................................................... 290/1 R
(58) Field of Classification Search ............. 290/1 R; 60/675
See application file for complete search history.

(56) References Cited

U.S. PATENT DOCUMENTS 3,953,971 A * 5/1976 Parker .......................... 60/641.6
5,873,249 A * 2/1999 Alkhamis ....................... 60/639

FOREIGN PATENT DOCUMENTS

| DE | 100 37 678 A1 | 2/2002 |
| DE | 20 2004 011770 U1 | 9/2004 |
| GB | 2 090 939 A | 7/1982 |
| GB | 224 807 A | 5/1990 |

OTHER PUBLICATIONS

International Search Report for corresponding PCT Application No. PCT/EP2008/009948 dated Mar. 17, 2009.

* cited by examiner

*Primary Examiner* — Javaid Nasri
(74) *Attorney, Agent, or Firm* — Wood, Phillips, Katz, Clark & Mortimer

(57) ABSTRACT

An energy storing system, which includes a plurality of weights; a first storing unit and a second storing unit, wherein the first storing unit is arranged below the second storing unit and each of the storing units includes a guiding track on which weights can be placed and along which weights can be moved, wherein each of these guiding tracks includes a first portion and a second portion, wherein the second portion is arranged below the first portion; and a loading unit configured to lift at least one weight from the first storing unit to the second storing unit during a first period thereby converting electrical energy to potential energy.

9 Claims, 4 Drawing Sheets

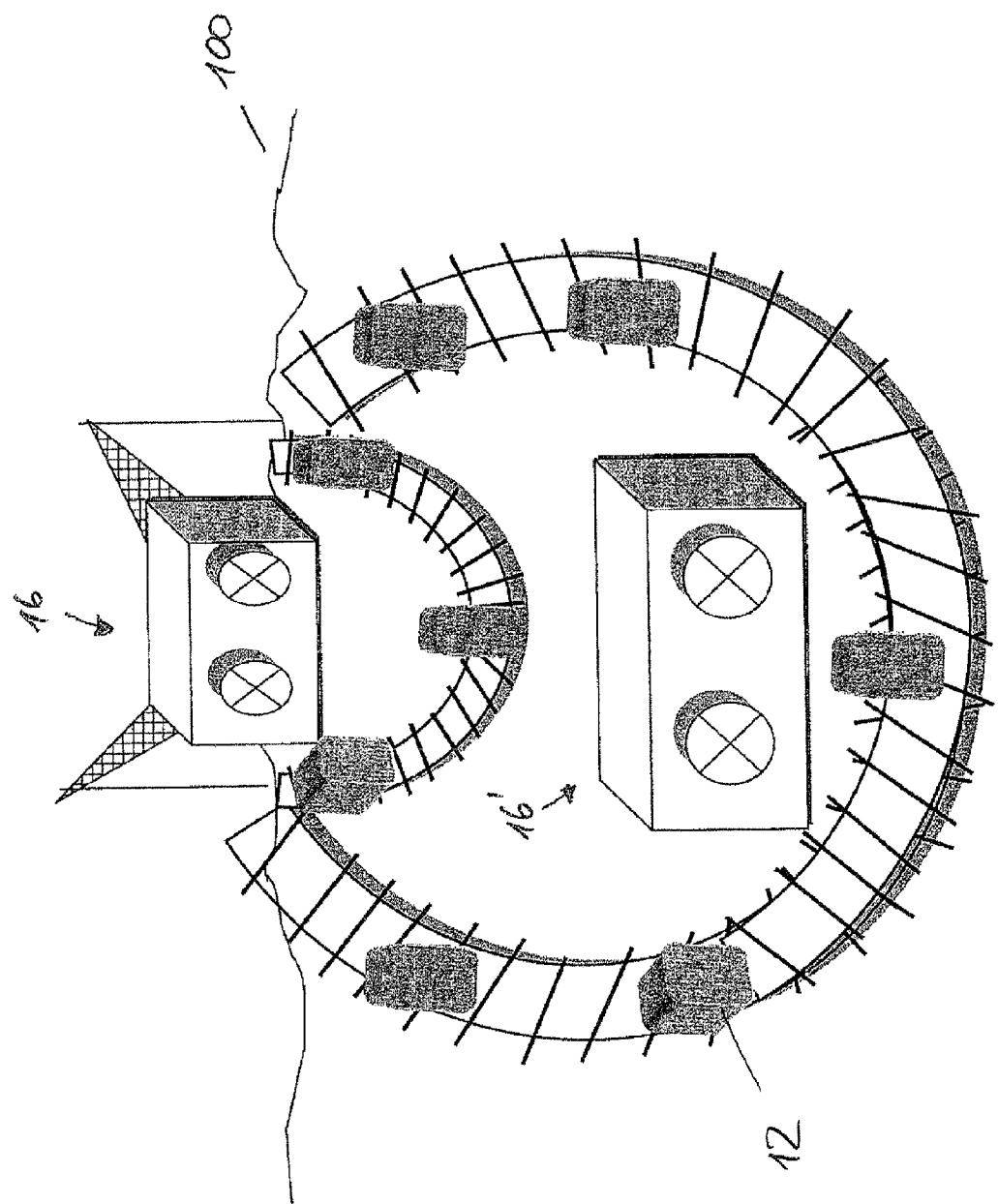

METHOD AND APPARATUS FOR STORING ENERGY

The invention relates to a method and apparatus for storing energy.

It is a common concern to all providers of electrical energy to match the demand for electricity with their ability to provide electricity. In the course of, for instance, a day, demand typically rises to a high level during certain peak times and falls to lower levels during off-peak times. To meet the peak time demand and make use of any surplus electricity which may be available during off-peak times, electricity providers aim to store surplus energy produced during off-peak times in order to supply this surplus energy during peak times. The source of energy can be either a power plant generating electricity at a more or less constant level or some form of intermittent energy source, such as a solar powered energy source or a wind powered energy source.

An example of such a system is discussed in U.S. Pat. No. 5,873,249. Therein, a system is provided for generating energy using the difference in elevation between a relatively high elevation and a relatively low elevation, the system comprising a weight; a lifting device for lifting the weight from the relatively low elevation to the relatively high elevation and for enabling lowering of the weight from the relatively high elevation to the relatively low elevation; a generator for producing electrical energy for consumption; means for converting energy produced by said lifting device during lowering of said weight into drive energy for driving said generator; an electric motor for driving said lifting device to provide lifting of said weight and for driving said generator; and an intermittently operating energy source for supplying electrical energy to the electric motor during operation of the energy source to drive the generator and to enable lifting of the weight by the lifting device whereby the weight can be lifted during operation of the energy source to provide potential energy for the system.

Thus, the source of potential energy provided by the weight in the raised position assists in evening out or making more uniform the overall energy that can be supplied. Said system, however, only refers to a single weight, which is being raised and lowered. This limits the flexibility and versatility of the system known in the prior art. While U.S. Pat. No. 5,873,249 also mentions the possibility to have more than one lifting device capable of lifting a respective weight, those embodiments show a high degree of redundancy in that e.g. with every lifting device separate conversion means and a separate generator are associated.

It is therefore an object of the present invention to provide a method and a system for storing energy showing improved flexibility and versatility and reduced redundancy.

An energy storing system according to the present invention comprises an energy storing system, comprising a plurality of weights, a first storing unit and a second storing unit, wherein the first storing unit is arranged below (i.e. at a lower elevation than) the second storing unit and each of the storing units comprises a guiding track on which weights can be placed and along which weights can be moved, wherein each of said guiding tracks comprises a first portion and a second portion, wherein each second portion is arranged below (i.e. at a lower elevation than) its corresponding first portion; and a loading unit configured to lift at least one weight from the first storing unit to the second storing unit during a first period thereby converting electrical energy to potential energy, said loading unit further configured to lower said at least one weight from the second storing unit to the first storing unit during a second period, thereby converting potential energy to electrical energy, wherein the loading unit is configured to collect a weight from the second portion of the first storing unit and to place said weight on the first portion of the second storing unit during the first period and to collect a weight from the second portion of the second storing unit and to place said weight on the first portion of the first storing unit during the second period.

The energy storing system according to the present invention provides for a flexible and scalable system due to the possibility to use a plurality of weights and to operate in a cyclical manner.

To allow each weight to move freely along the guiding track on which it is placed, each weight preferably comprises wheels. Those wheels are configured to allow said weight to move from the first, higher portion of said guiding track to the second, lower portion of said guiding track preferably by the action of gravity alone. Thus, a weight which was placed on the first portion of the second storing unit during the first period will move to the second portion of the second storing unit and be ready for collection at the beginning of the second period.

In a preferred embodiment, the loading mechanism comprises a loading stage having a guiding track configured to cooperate with the respective guiding track of any of the storing units to facilitate direct transfer of the weight between the loading stage and the respective guiding track.

In another preferred embodiment said energy storing system comprises a multitude of storing units arranged at different heights, whereby an even higher degree of versatility is possible.

In a preferred embodiment of the present invention, the number of weights transferred during both the first and the second period is equal, whereas the duration of the second period is different from the duration of the first period. Thus, it is possible to generate a higher/lower power level during the lowering of a particular total weight compared to the power level used during lifting of said total weight, wherein power is defined as converted energy per unit of time.

The invention also provides a method of producing electrical energy as described below.

A method according to the present invention comprises the steps of providing a plurality of weights; providing a first and a second storing unit, wherein the first storing unit is arranged below the second storing unit; lifting at least one weight from the lower storing unit to the upper storing unit during a first period thereby converting electrical energy to potential energy; and lowering said at least one weight from the upper storing unit to the lower storing unit during a second period, wherein the duration of the second period is different from the duration of the first period, thereby converting potential energy to electrical energy.

Preferably the second period is either shorter or longer than the first period so as to be able to provide a higher/lower power level during the second period in comparison to the power level used during the first period.

In a preferred embodiment, the first period is an off-peak electricity period whereas the second period is a peak electricity period.

Further details of the present invention will become clear from the detailed description and the accompanying figures, wherein:

FIG. 1 schematically shows an energy storing system according to the present invention;

FIG. 4 shows two upper storing units to be used in an energy storing system according to the present invention.

Figure 1:
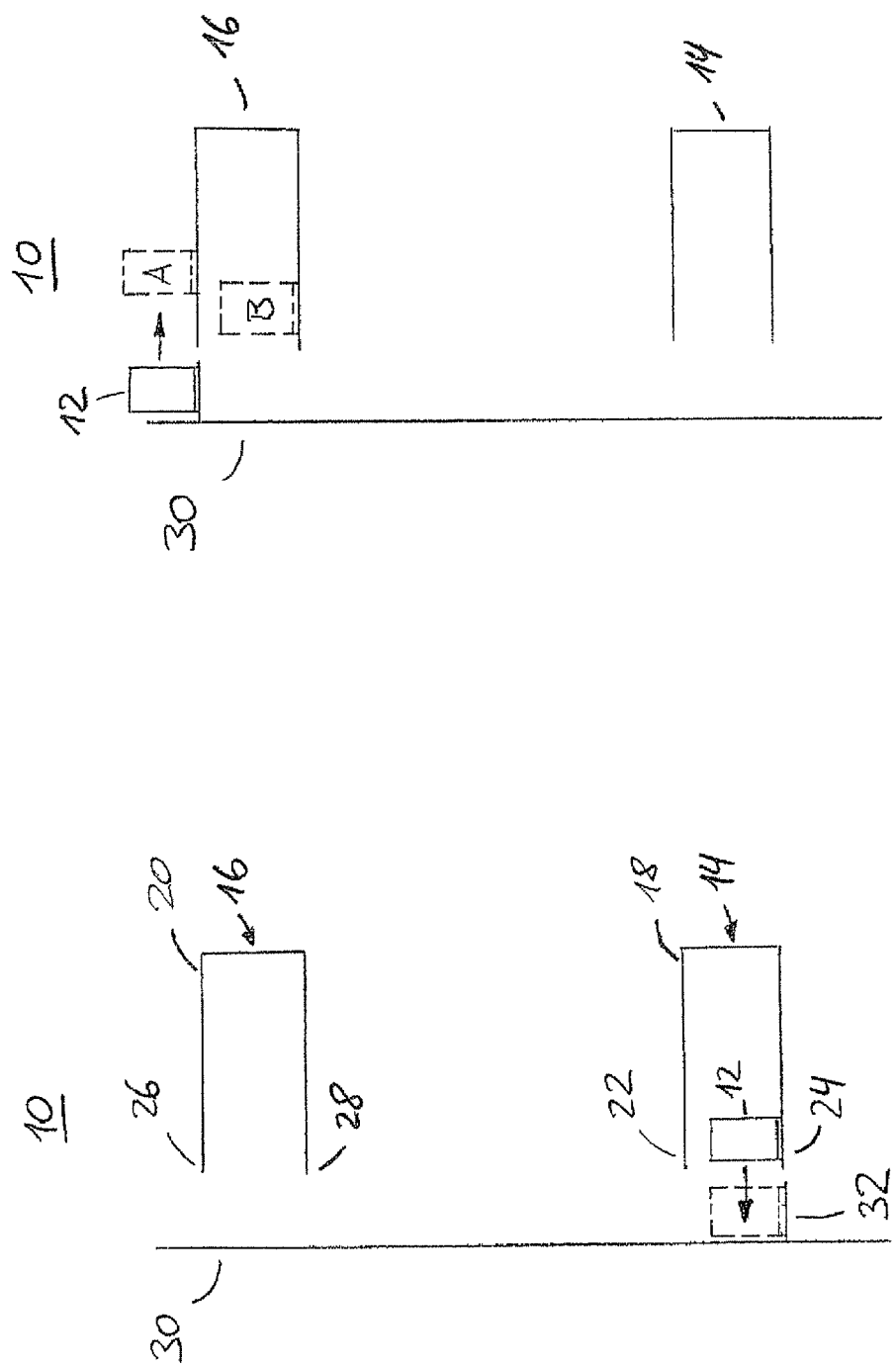
FIG. 1 is a schematic diagram showing an embodiment of the energy storing system 10 according to the present invention.

The energy storing system 10 comprises a plurality of weights 12, one of which being indicated in FIG. 1. The energy storing system 10 further comprises a first storing unit 14 and a second storing unit 16, wherein the first storing unit 14 is arranged below the second storing unit 16. Each of the storing units 14, 16 comprises a guiding track 18, 20 on which weights can be placed and along which weights can be moved. The first, lower guiding track 18 comprises a first portion 22 and a second portion 24, wherein the second portion 24 is arranged slightly below the first portion 22. Similarly, the second, upper guiding track 20 comprises a first portion 26 and a second portion 28, wherein the second portion 28 is arranged slightly below the first portion 26.

The energy storing system further comprises a loading unit 30 comprising a loading stage 32. As indicated in FIG. 1, said loading stage 32 can be moved up and down in between the first and second storing units 14, 16 in a predominantly vertical direction.

Shown in the left hand part of FIG. 1 is the transfer of a weight 12 from the lower portion 24 of the lower storing unit 14 on to the loading stage 32 (indicated by an arrow). Said weight 12 on loading stage 32 can then be lifted up to the second storing unit 16. To this end, the loading stage 32 is raised to and aligned with the first, upper portion 26 of the guiding track 20 of the second storing unit 16, as shown in the right hand part of FIG. 1. Subsequently, said weight 12 is transferred or placed on the guiding track 20. This latter operation is indicated by the arrow shown in the right hand part of FIG. 1.

Since the first portion 26 of guiding track 20 is arranged at a higher position/elevation relative to the second portion 28 thereof, weight 12 will move along the guiding track 20 from position "A" in the first portion 26 to position "B" in the second portion 28, since each weight 12 is fitted with wheels 13 allowing said weight 12 to move freely along each guiding track 18, 20. Once in position "B", said weight 12 is ready for collection to be transferred back to the first storing unit 14. More specifically, loading stage 32 can collect weight 12 from the second portion 28 of the upper guiding track 20, lower said weight 12 to the lower guiding track 18 and offload said weight 12 on to the first portion 22 of lower guiding track 18. Again, said weight 12 will move from the first, higher portion 22 to the second, lower portion 24 of guiding track 18. Thus, weight 12 is once more ready for collection to be lifted back up to the upper storing unit 16 and thus to start a new cycle.

The system shown in FIG. 1 can be used to lift weights 12 from the lower storing unit 14 to the upper storing unit 16 during a first peak electricity period and to lower those weights 12 from the upper storing unit 16 back to the lower storing unit 14 during a second, off-peak electricity period. By varying the duration of the second period relative to the duration of the first period, the released power can be controlled. For instance, if a particular weight 12 is lifted within a duration of 60 minutes and lowered within a duration of 30 minutes, twice the power will be available in the course of the second period.

Figure 2:
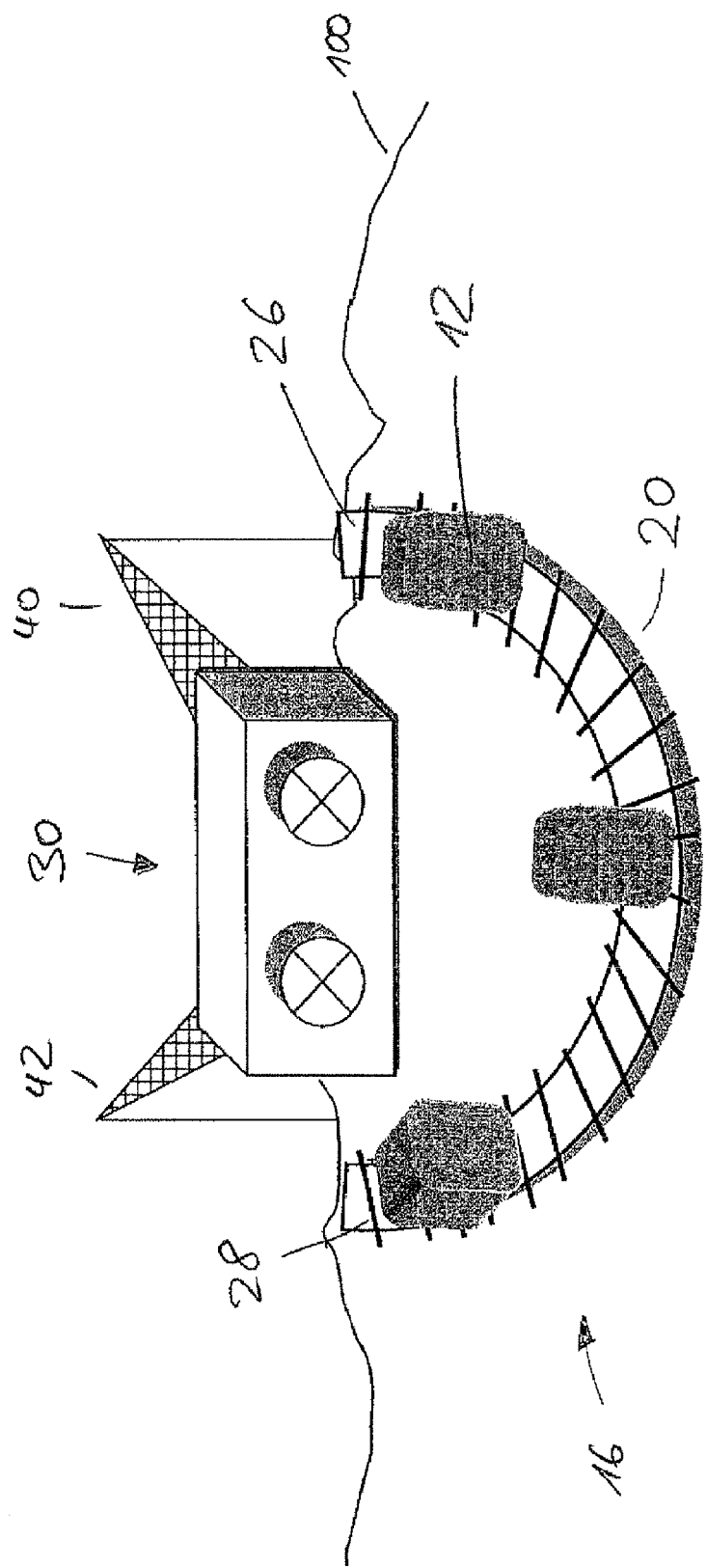
FIG. 2 shows a storing unit to be used in an energy storing system according to the present invention.

FIG. 2 shows an embodiment of the energy system, wherein the upper storing unit 16 is arranged near the top of a hill or mountain 100. Loading unit 30, which, in the embodiment shown in FIG. 2 comprises two lifters 40, 42, lifts weights 12 during a first period from the lower storing unit 14 (not shown in FIG. 2) up to the second storing unit 16, more particularly, to the first end 26 of guiding track 20 of the second, upper storing unit 16. From said first end 26 the weights 12 will move towards the second end 28, which is arranged at the slightly lower level in comparison to the first end 26. The loading unit 30 can then collect weights 12 from the second end 28 and lower those weights back to the first storing unit 14 during a second period.

Figure 3:
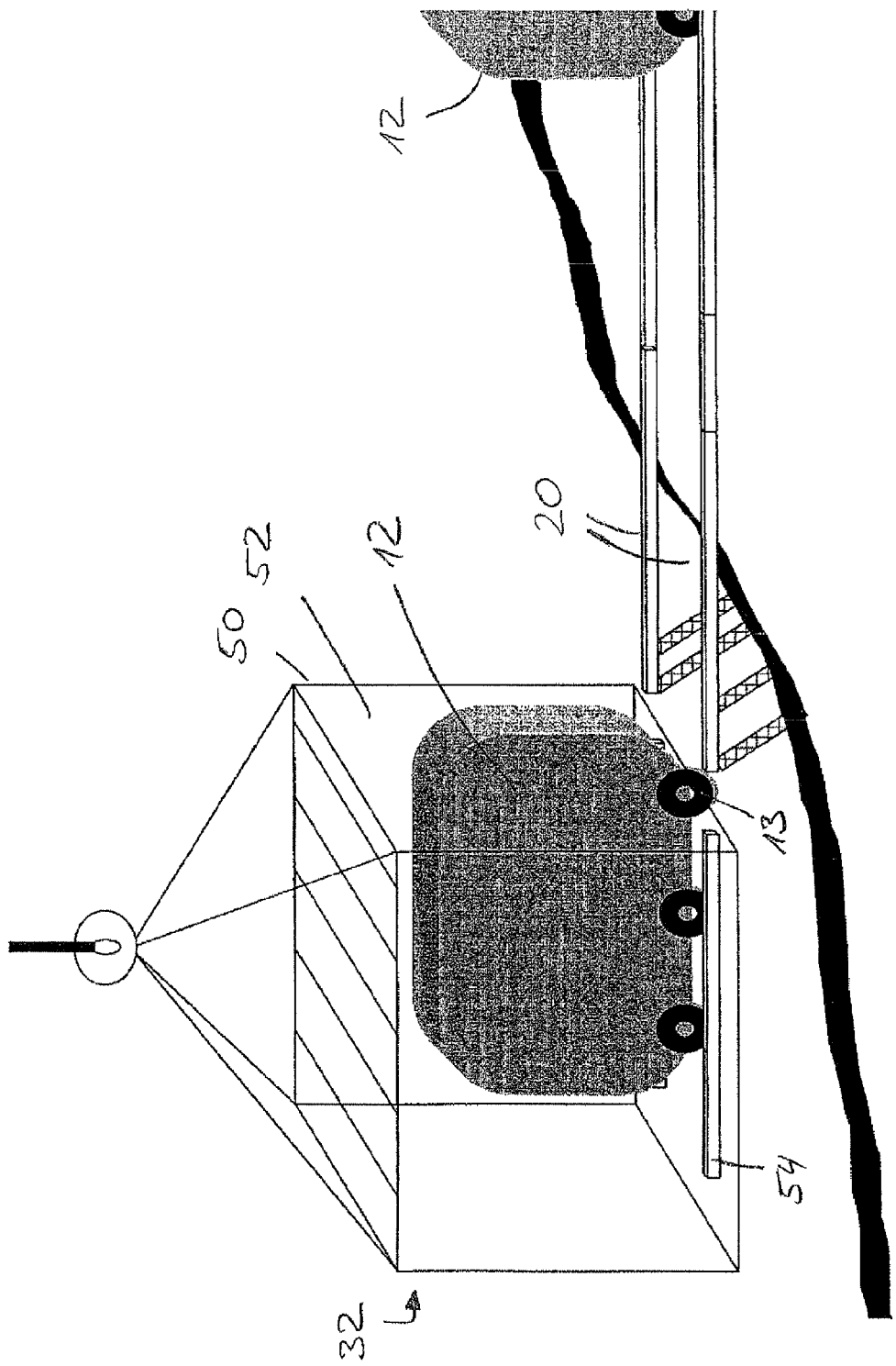
FIG. 3 shows details of the loading units to be used in the energy storing system according to the present invention.

FIG. 3 shows details of the loading stage 32. Loading stage 32 comprises a cabin 50 having an opening 52 facing the storing units 14, 16 during raising and lowering operations. A stage guiding track 54 is arranged at the bottom and on the inside of cabin 50. Said stage guiding track forms an extension of the guiding tracks 18, 20 of the lower and upper storing units 14, 16, respectively, when said cabin 50 is substantially aligned with either end of a guiding track 18, 20. In this aligned state, weight 12 having wheels 13 can be readily transferred between cabin 50 and the guiding tracks 18, 20.

FIG. 4 shows two upper storing units 16, 16' at the back of the edge of a mountain, wherein both guiding tracks reach the edge of the mountain 100. On the lifters there will be to every unit an axis on which in this case the axis of unit 16' will be higher than the axis of unit 16 also by raising the height of the lifters more units can be added on the back of the mountain's edge.

The invention also provides a method of producing electrical energy as described below.

A method according to the present invention comprises the steps of providing a plurality of weights; providing a first and a second storing unit, wherein the first storing unit is arranged below the second storing unit; lifting at least one weight from the lower storing unit to the upper storing unit during a first period thereby converting electrical energy to potential energy; and lowering said at least one weight from the upper storing unit to the lower storing unit during a second period, wherein the duration of the second period is different from the duration of the first period, thereby converting potential energy to electrical energy.

Preferably the second period is either shorter or longer than the first period so as to be able to provide a higher/lower power level during the second period in comparison to the power level used during the first period.

In a preferred embodiment, the first period is an off-peak electricity period whereas the second period is a peak electricity period.

Although the present invention has been described in relation to specific exemplary embodiments thereof, it will be understood by those skilled in the art that variations and modifications can be effected in these exemplary embodiments without departing from the scope of the invention.

The invention claimed is:

1. An energy storing system, comprising
a plurality of weights (12);
a first storing unit (14) and a second storing unit (16), wherein the first storing unit (14) is arranged below the second storing unit (16) and each of the storing units (14, 16) comprises a guiding track (18, 20) on which weights (12) can be placed and along which weights (12) can be moved, wherein each of said guiding tracks (18, 20) comprises a first portion (22, 26) and a second portion (24, 28), wherein the second portion (24, 28) is arranged below the first portion (22, 26); and
a loading unit (30) configured to lift at least one weight (12) from the first storing unit (14) to the second storing unit (16) during a first period thereby converting electrical energy to potential energy, said loading unit (30) further configured to lower at least one weight (12) from the second storing unit (16) to the first storing unit (14) during a second period, thereby converting potential energy to electrical energy, wherein the loading unit (30) is configured to collect a weight (12) from the second portion (24) of the first storing unit (14) and to place said weight on the first portion (26) of the second storing unit (16) during the first period and to collect a weight (12) from the second portion (28) of the second storing unit (16) and to place said weight (12) on the first portion (22) of the first storing unit (14) during the second period.

2. The energy storing system according to claim 1, wherein each weight (12) comprises means such as wheels (13) configured to allow said weight to move freely along the guiding track (18, 20), on which said weight is placed, from the first portion (22, 26) to the second portion (24, 28) of said guiding track (18, 20).

3. The energy storing system according to claim 1, wherein the loading unit (30) comprises a loading stage (32) having a stage guiding track (54) configured to co-operate with the respective guiding track (18, 20) of any of the storing units (14, 16) to facilitate transfer of a weight between the loading stage (30) and the respective guiding track (18, 20).

4. The energy storing system according to claim 1, comprising a multitude of storing units arranged at different heights.

5. The energy storing system according to claim 1, wherein the duration of the second period is different from the duration of the first period.

6. A method comprising the following steps
providing a plurality of weights;
providing a first and a second storing unit, wherein the first storing unit is arranged below the second storing unit;
lifting at least one weight from the lower storing unit to the upper storing unit during a first period thereby converting electrical energy to potential energy; and
lowering at least one weight from the upper storing unit to the lower storing unit during a second period, wherein the duration of the second period is different from the duration of the first period, thereby converting potential energy to electrical energy.

7. The method according to claim 6, wherein the second period is shorter than the first period.

8. The method according to claim 6, wherein the second period is longer than the first period.

9. The method according to claim 6, wherein the first period is an off-peak electricity period and the second period is a peak electricity period.

* * * * *